(12) United States Patent
Tokuyasu et al.

(10) Patent No.: US 10,012,522 B2
(45) Date of Patent: Jul. 3, 2018

(54) THERMAL FLOW METER

(71) Applicant: Hitachi Automotive Systems, Ltd., Hitachinaka-shi, Ibaraki (JP)

(72) Inventors: Noboru Tokuyasu, Hitachinaka (JP); Shinobu Tashiro, Hitachinaka (JP); Keiji Hanzawa, Hitachinaka (JP); Takeshi Morino, Hitachinaka (JP); Ryosuke Doi, Hitachinaka (JP)

(73) Assignee: Hitachi Automotive Systems, Ltd., Hitachinaka-shi (JP)

( * ) Notice: Subject to any disclaimer, the term of this patent is extended or adjusted under 35 U.S.C. 154(b) by 0 days.

(21) Appl. No.: 15/476,007

(22) Filed: Mar. 31, 2017

(65) Prior Publication Data

US 2017/0205262 A1    Jul. 20, 2017

Related U.S. Application Data

(63) Continuation of application No. 14/363,002, filed as application No. PCT/JP2012/079887 on Nov. 19, 2012, now Pat. No. 9,658,094.

(30) Foreign Application Priority Data

Dec. 7, 2011   (JP) ................. 2011-267451

(51) Int. Cl.
*G01F 5/00* (2006.01)
*G01F 1/692* (2006.01)
(Continued)

(52) U.S. Cl.
CPC ............ *G01F 1/692* (2013.01); *F01N 11/002* (2013.01); *F02D 41/187* (2013.01); *G01F 1/684* (2013.01);
(Continued)

(58) Field of Classification Search
CPC ........................................................ G01F 5/00
See application file for complete search history.

(56) References Cited

U.S. PATENT DOCUMENTS 4,651,564 A    3/1987    Johnson et al.
5,251,636 A    10/1993   Neuman
(Continued)

FOREIGN PATENT DOCUMENTS

JP    11-6752 A    1/1999
JP    2005-98795 A    4/2005
(Continued)

OTHER PUBLICATIONS

Corresponding International Search Report dated Feb. 19, 2013 with English Translation (four (4) pages).
(Continued)

*Primary Examiner* — Ryan Walsh
(74) *Attorney, Agent, or Firm* — Crowell & Moring LLP

(57) ABSTRACT

A thermal-type flowmeter includes a chip package. The chip package is formed through encapsulation with a resin of a sensor element, a drive circuit, a metal lead frame adapted to have mounted thereon the sensor element and the drive circuit, and a temperature detecting element. The chip package has an exposed structure in which a surface of the sensor element having the diaphragm is exposed. The temperature detecting element is mounted on the lead frame via an electrically conductive member.

9 Claims, 7 Drawing Sheets

(51) Int. Cl.
*F02D 41/18* (2006.01)
*G01F 1/684* (2006.01)
*G01F 15/04* (2006.01)
*F01N 11/00* (2006.01)

(52) U.S. Cl.
CPC ................ *G01F 5/00* (2013.01); *G01F 15/04* (2013.01); *F01N 2560/07* (2013.01)

(56) References Cited

U.S. PATENT DOCUMENTS

| | | | |
|---|---|---|---|
| 5,631,416 | A | 5/1997 | Rilling et al. |
| 6,516,785 | B1 | 2/2003 | Nakada et al. |
| 6,769,298 | B2 | 8/2004 | Matsumura et al. |
| 2005/0062121 | A1 | 3/2005 | Toyoda |
| 2006/0065049 | A1 | 3/2006 | Nakada et al. |
| 2007/0089504 | A1* | 4/2007 | Hanzawa ............... G01F 1/6845 73/204.26 |
| 2008/0013298 | A1 | 1/2008 | Sharma et al. |
| 2009/0199378 | A1 | 8/2009 | Chacko |
| 2010/0077851 | A1* | 4/2010 | Minamitani .......... G01F 1/6845 73/204.26 |
| 2011/0016981 | A1 | 1/2011 | Gebauer et al. |
| 2011/0023597 | A1* | 2/2011 | Nakano ................. G01F 1/6845 73/204.25 |
| 2011/0140211 | A1 | 6/2011 | Kono et al. |
| 2011/0271768 | A1 | 11/2011 | Mizutani et al. |
| 2012/0055245 | A1* | 3/2012 | Doi ....................... G01F 1/6845 73/204.11 |
| 2015/0000395 | A1* | 1/2015 | Tashiro ................. F02D 41/182 73/204.26 |

FOREIGN PATENT DOCUMENTS

| | | |
|---|---|---|
| JP | 2008-20193 A | 1/2008 |
| JP | 2008-175780 A | 7/2008 |
| JP | 2009-58230 A | 3/2009 |
| JP | 2009-544149 A | 12/2009 |
| JP | 2011-122984 A | 6/2011 |
| JP | 2012-112979 A | 6/2012 |
| JP | 2013-50458 A | 3/2013 |
| WO | WO 02/10694 A1 | 2/2002 |

OTHER PUBLICATIONS

Japanese-language Written Opinion dated Feb. 19, 2013 (PCT/ISA/237) (five (5) pages).
European Search Report issued in counterpart European Application No. 12854859.1 dated Jul. 31, 2015 (three (3) pages).
Japanese-language Office Action dated Feb. 3, 2017 with English Translation (three(3) pages).

\* cited by examiner

THERMAL FLOW METER

CROSS REFERENCE

This application is a continuation of U.S. application Ser. No. 14/363,002, filed Jun. 5, 2014, which is a National Stage application of PCT International Application No. PCT/JP2012/079887, filed Nov. 19, 2012, which claims priority to Japanese Patent Application No. 2011-267451, filed Dec. 7, 2011, the disclosures of which are expressly incorporated by reference herein.

TECHNICAL FIELD

The invention relates to a thermal-type air flowmeter having an exothermic resistor provided in a fluid under measurement, for use in measurement of a flow rate, and in particular, to an air flowmeter suitable for use in measurement of an intake air flow-rate as well as an exhaust gas flow-rate of the internal combustion engine of an automobile.

BACKGROUND ART

A thermal-type air flowmeter capable of directly measuring a mass flow-rate, serving as an air flowmeter that detects an intake air flow-rate of the internal combustion engines of an automobile, and so forth, is in the mainstream.

A proposal has lately been made to manufacture a sensor element of a thermal-type flowmeter on a semiconductor substrate of silicon (Si), and so forth, by making use of a micro-machine technology. With this sensor element of a semiconductor type, a cavity is formed by removing a part of semiconductor substrate, rectangular in shape, and an exothermic resistor is formed on an electrically insulating film several μm in thickness, formed on the cavity, that is, a thin-film part. Further, a temperature sensor (a temperature sensing resistor) is formed upstream, and downstream, respectively, in the vicinity of the exothermic resistor, and discrimination between down-flow and back-flow is possible according to a temperature differential method whereby a flow rate is detected on the basis of a difference in temperature between upstream and downstream, respectively, of the exothermic resistor. The exothermic resistor is as microscopic as several hundred μm in size, and can be formed in the shape of a thin film, so that the exothermic resistor is small in thermal capacity, thereby enabling faster response, and lower power consumption to be attained.

In Patent Document 1, there is described a mount structure for a sensor element, and drive circuits, in the thermal-type flowmeter having the sensor element of the semiconductor type, formation of the so-called chip-package.

In Patent Document 1, there is disclosed a configuration whereby a sensor chip that detects a flow-rate of a liquid, a lead as an external connection terminal electrically coupled to the sensor chip, and a connection between the sensor chip and the lead are coated, provided with an encapsulation resin integrally disposed so as to enable a flow-rate detection part to be exposed. Further, in FIG. 2 of Patent Document 1, there is shown an example in which a drive chip as well is mounted on a metal lead frame concurrently with the sensor chip.

CITATION LIST

Patent Literature

Patent Document 1:
JP Patent Publication (Kokai) No. 2008-175780 A

SUMMARY OF INVENTION

Technical Problem

With an air flowmeter having a presently operational sensor element of a semiconductor type, one with a configuration where a sensor element and drive circuits are mounted on a ceramic substrate, such as LTCC (Low Temperature Co-fired Ceramics) and so forth, and the substrate is mounted inside a product body is in the mainstream. For the drive circuits, use is made of LSI built in one chip by use of a semiconductor-integration technology from the viewpoint of mountability. Further, in order to protect the drive circuits from noise due to disturbance such as a surge, electromagnetic interference, and so forth, a chip capacitor is separately provided on the ceramic substrate to be electrically coupled to the drive circuits. This chip capacitor that protects the drive circuits from the noise is large in capacity, being often disposed externally on the ceramic substrate without being disposed within LSI.

On the other hand, with a thermal-type air flowmeter for use in the automobile, those including an air-temperature detection-element that detects the temperature of an air taken into an engine, formed integrally therewith, account for the vast majority thereof. This detection of the air-temperature is imported into an engine control unit independently of measurement of an air flow-rate, for use in control of combustion inside the engine. The detection is vitally needed for the control of combustion inside the engine at transient times for the purposes such as early activation of a catalyst at the time of a cold start, reduction in $NO_x$ included in an exhaust gas emitted at a time of a sudden change in an engine state, occurring after an engine warm-up, and so forth. Even from these application purposes, fast responsiveness is required of the temperature detection-element.

There are available a plurality of means that detect temperature, and in many cases, a thermistor element is used in view of these requirements, an element called an axial-lead type, in particular, where lead wires are arranged such that the positive pole and the negative pole are lined up substantially on the same straight line in the axial direction, being in widespread use. The temperature detection element of the axial-lead type is connected to a lead terminal inserted in a resin enclosure of the air flowmeter, by welding to be fixed thereto.

As described above, the chip capacitor configuring a protection circuit that protects the drive circuits, and the element that detects the intake air are each individually mounted, so that a construction becomes complicated.

It is therefore an object of the invention to provide a thermal-type flowmeter highly accurate, with high reliability, and simple in construction, while being available at a lower price.

Solution to Problem

To that end, in accordance with one aspect of the invention, there is provided a thermal-type flowmeter including a sub-path that takes in a fluid under measurement, a sensor element that measures a flow-rate of the fluid under measurement in the sub-path, a temperature detection element that detects a temperature of the fluid under measurement, a drive circuit that controls a heating temperature of the sensor element, and a protection circuit that protects the drive circuit from noise, while a cavity is formed on a substrate of the sensor element, an exothermic resistor is provided on a thin-film part through the intermediary of an electrically insulating film, and a flow rate is detected on the basis of temperature distribution in the thin-film part. Further, the sensor element and the drive circuit are mounted on a metal lead fame, the entire periphery of the sensor element, the drive circuit, and the lead fame is encapsulated with a thermosetting resin to thereby complete a chip package, and at least one of a chip component that protects the drive circuit, and an air-temperature detecting element is consolidated inside the chip package.

Advantageous Effects of Invention

Thus, the invention can provide a thermal-type flowmeter highly accurate, with high reliability, and simple in construction, while being available at a lower price.

DESCRIPTION OF EMBODIMENTS

Embodiments of the invention are described hereinafter.

Figure 1:
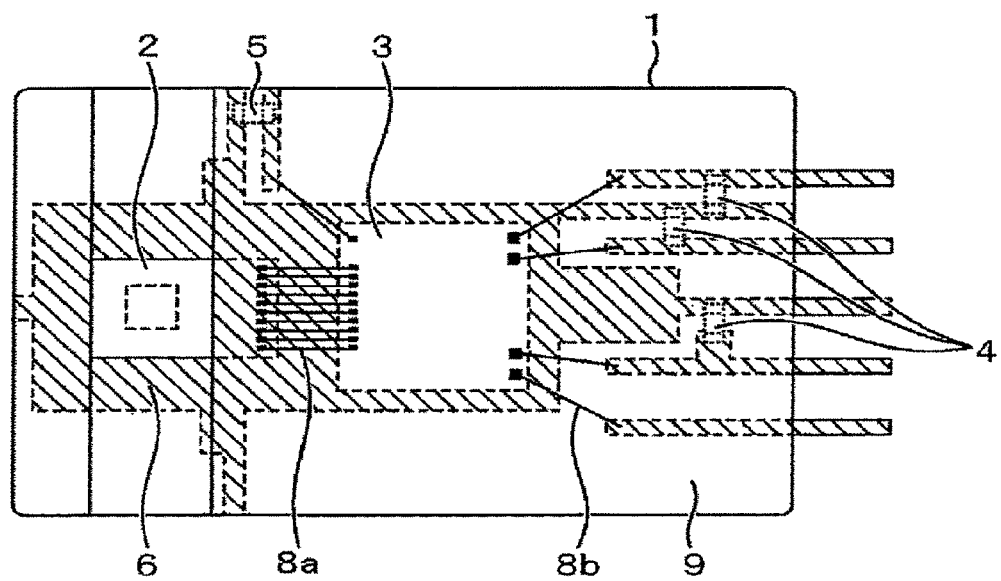
FIG. 1 is view showing a planar configuration of a chip package according to a first embodiment of the invention.
Figure 2:
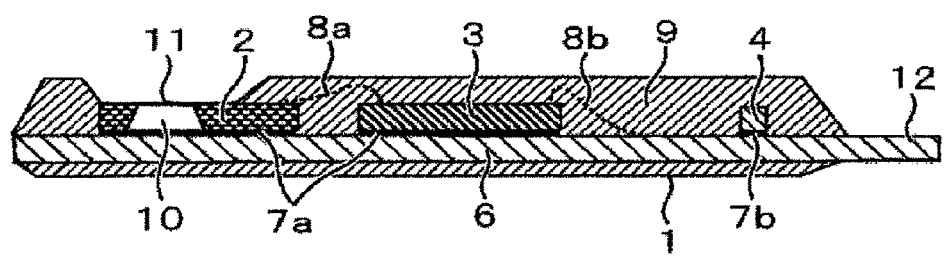
FIG. 2 is a sectional view showing the chip package according to the first embodiment of the invention.

FIGS. 1, 2 each show a configuration of a first embodiment of a chip package according to the invention. In FIG. 1, with a chip package 1, a sensor element 2, drive circuit 3, chip capacitors 4, and a chip thermistor 5 are directly mounted on a lead frame 6 as a metal substrate, and electrical coupling between the sensor element 2 and the respective drive circuit 3, and electrical coupling between the respective drive circuit 3 and the lead frame 6 are made via gold bonding wires 8a, and gold bonding wires 8b, respectively. The lead frame 6 with these chip components, such as the sensor element 2, the drive circuit 3, the chip capacitors 4, and the chip thermistor 5, mounted thereon, is formed by molding to thereby seal the whole periphery thereof with the use of a thermosetting resin 9.

As shown in the sectional view of FIG. 2, the chip components including the sensor element 2, and so forth are fixedly bonded to the lead frame 6 by the intermediary of respective adhesives 7a, 7b. As for the adhesive 7b that is electrically conductive, for use in the chip capacitor 4, and the chip thermistor 5 depicted in FIG. 1, in particular, there is the need for using an electrically conductive adhesive in order to secure conduction between an electrode of each of these chip components and the lead frame 6. The sensor element 2 that measures a flow-rate under measurement has a cavity 10 formed in a semiconductor substrate, and a thin-film part 11 several µm in thickness is formed therein. An exothermic resistor is formed in the thin-film part 11 by the intermediary of an electrically insulating film, temperature sensing resistors are formed in the vicinity of the exothermic resistor, and upon the thin-film part being heated up by the exothermic resistor, variation in temperature distribution, occurring depending on variation in flow-rate of a fluid flowing on the surface thereof, is detected by the temperature sensing resistors formed in the surroundings to thereby measure a mass flow-rate. On the basis of these measurement principles, the thin-film part 11 of the sensor element 2 is encapsulated with a resin in such a way as to be partially exposed out of the thermosetting resin 9 covering the periphery thereof.

Further, aluminum electrodes are formed on the outer peripheries of the sensor element 2 and the drive circuit 3, respectively, the sensor element 2 is connected to the respective drive circuit 3 through direct coupling between the aluminum electrodes via the gold bonding wires 8a, and furthermore, the lead frame 6 is connected to the power supply as well as the GND of a drive circuit, other than the aluminum electrodes of the respective drive circuit 3, or output aluminum electrodes, via the gold bonding wires 8b. In the respective drive circuit 3, a signal that controls a temperature of the exothermic resistor formed in the sensor element 2, and a signal detected by the sensor element 2 are converted into a signal indicating an equivalent flow-rate. These flow-rate signals are each imported and fetched from the respective drive circuit 3 through respective input-output terminals 12 protruding out of the thermosetting resin 9 via the gold bonding wires 8b.

In FIGS. 1, 2, a configuration is shown whereby the chip capacitors 4 that protect the drive circuit 3, and the chip thermistor 5 serving as an air-temperature detection-element, are concurrently encapsulated with the resin; however, use may be made of another configuration whereby only either one of those chip components is consolidated inside the chip package 1. In this case, the thermal-type flowmeter is simplified in configuration, thereby enabling back-end production process steps to be simpler, so that advantageous effects of the invention can be obtained.

Now, there is described hereinafter problems with the configuration for encapsulating the sensor element of the semiconductor type, as proposed by the present invention, with the use of the resin. As described with reference to FIG. 2, the cavity 10 is formed in the sensor element 2, the cavity 10 having the thin-film part 11 several µm in thickness. The thinness of the thin-film part 11 greatly contributes to fast response, as the feature of the thermal-type flowmeter making use of the element of the semiconductor type. On the other hand, the thin-film part 11 is sensitive to mechanical stress and stress attributable to thermal expansion/shrinkage, owing to smallness in the thickness thereof, so that care is required in a production process, in particular. If a metal mold for molding comes in direct contact with the thin-film part 11 at the time of the molding with the use of the thermosetting resin 9, this will pose the risk of causing damage to, and a crack on the thin-film part 11 because of the feature described as above. Further, if the cavity 10 of the sensor element 2 is hermetically sealed with the use of the thermosetting resin 9, this will cause an air sealed therein to repeatedly undergo expansion/shrinkage, depending on variation in ambient temperature, and so forth, whereupon stress will be applied to the thin-film part 11 to thereby raise a concern about adverse effects exerted on detection accuracy in flow-rate.

In order to circumvent those problems described in the foregoing, at the time of forming the chip package proposed by the present invention by molding, a relief (concave in shape) is preferably provided at, for example, a spot where the metal mold for molding is apt to come in contact with the thin-film part 11 to implement the molding in such a way as to prevent the metal mold from coming in direct contact with the thin-film part 11, while partially exposing the thin-film part 11 of the sensor element 2 out of the thermosetting resin 9 after the molding. Further, in connection with a problem arising at the time of hermetically sealing the thin-film part 11 of the sensor element 2, for example, a function for serving as a path 13 is preferably imparted in advance to the lead frame 6 with chip components mounted thereon, as shown in the section of a chip package according to a second embodiment of the invention, shown in FIG. 3, and a part of an outlet 14 of the path 13 is preferably pressed down with the metal mold for molding at the time of molding to thereby allow the outlet 14 to communicate with the outside of the chip package 1. By so doing, since the cavity 10 of the sensor element 2 communicates with the outside of the thermosetting resin 9 at all times, expansion/shrinkage of the air sealed in the cavity 10, attributable to variation in the ambient temperature, will be accommodated by running out of the thermosetting resin 9 to outside and suction thereof from outside to thereby prevent stress from being applied to the thin-film part 11.

A suitable layout of the chip components to be mounted in the chip package is described hereinafter with reference to FIGS. 3 through 5.

Key points in the mounting of the chip package in the thermal-type flowmeter are described hereinafter with reference to FIG. 4. FIG. 4 shows a configuration of the thermal-type flowmeter in the case where the chip package, as shown in the section view of FIG. 3, is mounted therein. The chip package is fixed to the enclosure 15 of the thermal-type flowmeter. As for a fixing method in this case, fixing is preferably made with the use of a thermosetting adhesive that has been used in various cases in the past. Otherwise, use of a room-temperature setting type adhesive, or use of a mechanical fixing means poses no problem, in particular. A sub-path 17 that takes in an air flowing inside an intake pipe path 16 is formed at the tip of the enclosure 15. With the sub-path 17, a path is made up by a cover that is disposed in such a way as to clamp the enclosure 15. The thin-film part 11 of the sensor element 2, exposed out of the thermosetting resin 9 of the chip package 1, and the chip thermistor 5 that detects an air-temperature are disposed in the enclosure 15 in such a way as to be placed inside the sub-path 17. Further, as for the shape of the sub-path 17, the sub-path 17 is shown in FIG. 4 by taking the case of the sub-path 17 being a straight-line in path-shape by way of example, however, a path-shape capable of causing the air taken into the sub-path to swivel around, such as a detour-shape, and so forth, may be adopted. Other chip components, encapsulated by the resin of the chip package 1, that is, the drive circuit 3, and the chip capacitors 4 are disposed in a circuit chamber 18, and the sub-path 17 is partitioned off from a boundary 19 of the circuit chamber 18 by use of a means capable of keeping airtightness between the sub-path 17 and the circuit chamber 18. The input-output terminals 12 protruding out of the chip package 1 are connected to connector terminals 21, respectively, by welding, and so forth, inside the circuit chamber 18, and a signal is outputted from a connector 20.

Figure 3:
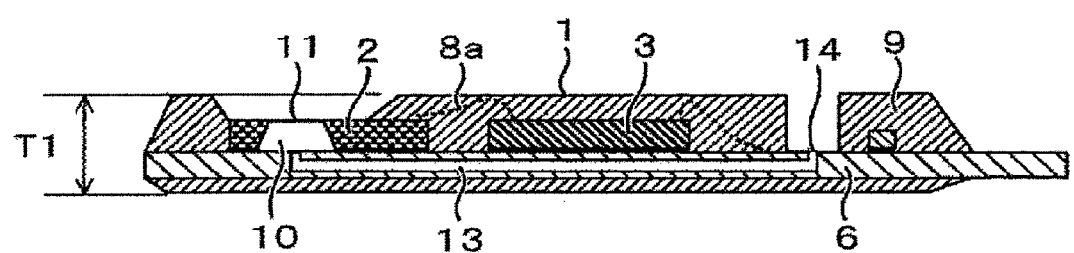
FIG. 3 is a sectional view showing a chip package according to a second embodiment of the invention.
Figure 4:
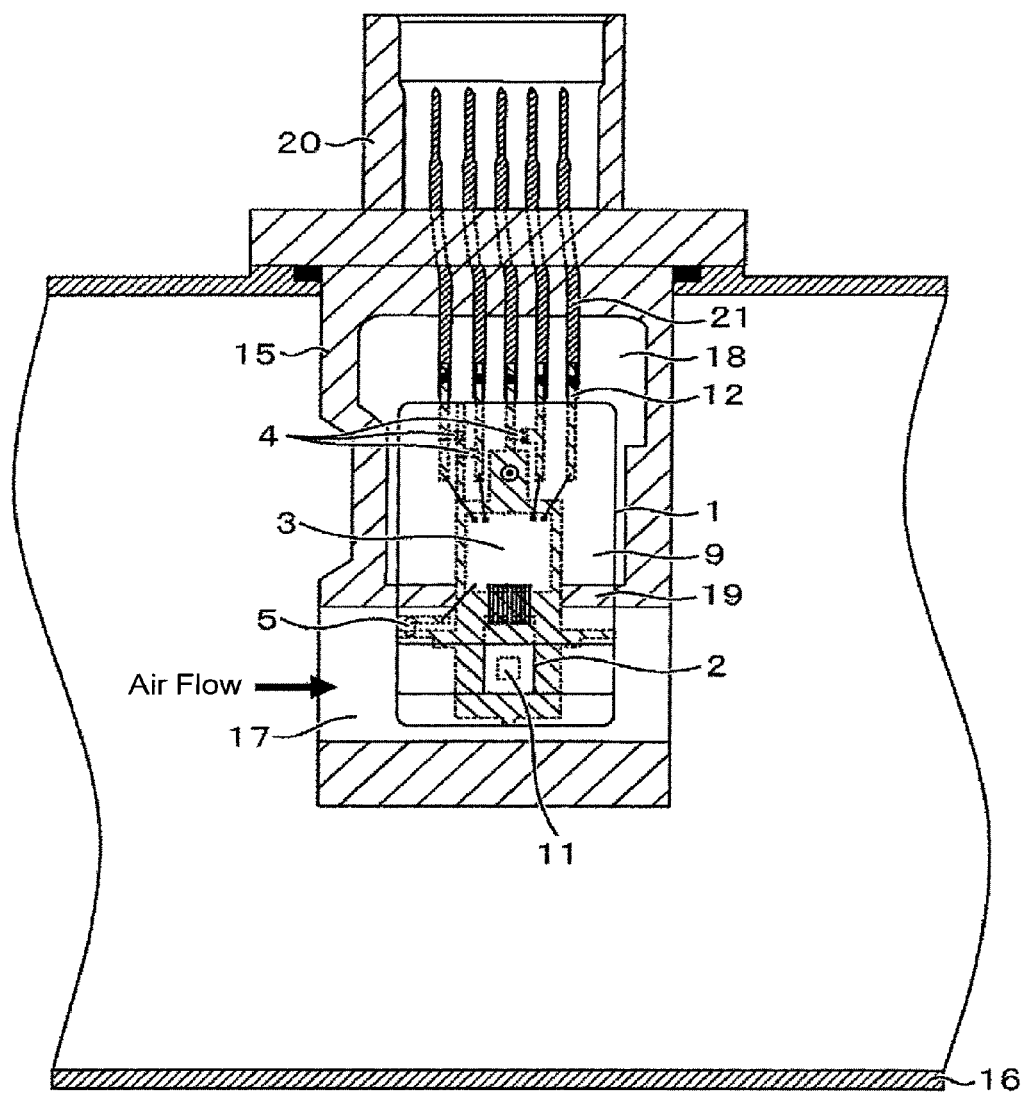
FIG. 4 is a configuration diagram of a thermal-type flowmeter where the chip package according to the second embodiment of the invention is mounted.
Figure 5:
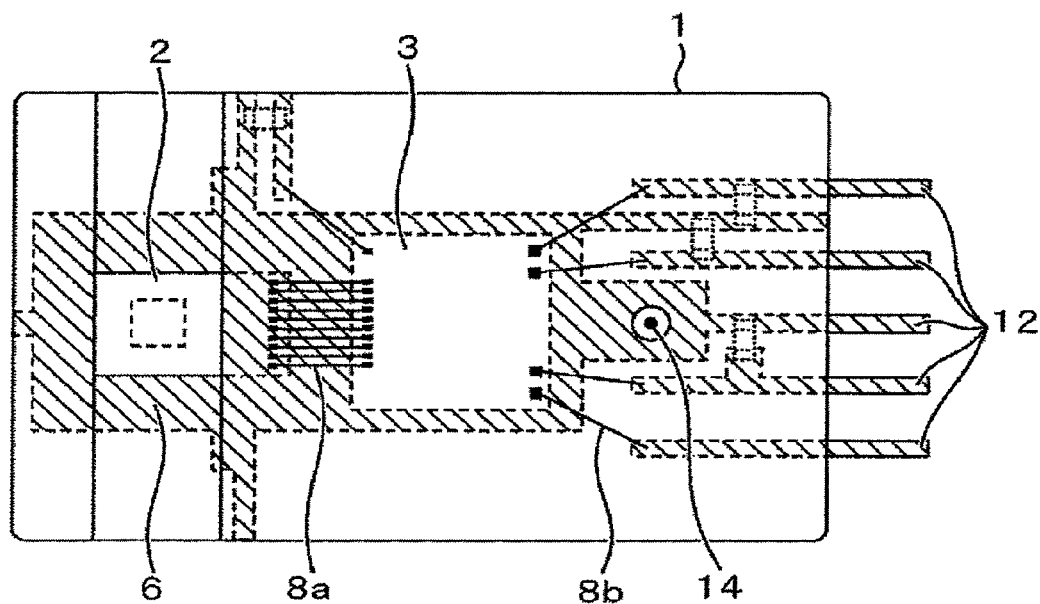
FIG. 5 is a view showing a planar configuration of the chip package according to the second embodiment of the invention.

FIG. 5 is a view showing a planar configuration of the chip package shown in FIG. 3. As previously described, the sensor element 2 that detects the flow rate, and the respective drive circuit 3 are mounted on the lead frame 6 to be electrical coupled with each other via the gold bonding wires 8a. In the case of connection by bonding with the use of the gold bonding wires, the sensor element 2 is preferably in close proximity to the respective drive circuit 3, so as to be away from each other on the order of 2 to 4 mm because of constraints due to a height as well as a length of a gold bonding wire loop. A width and a length of the lead frame 6 at each place where the sensor element 2 and the drive circuit 3 are mounted are limited by a size of the sensor element 2 and the drive circuit 3, respectively and routing of the input-output terminal 12. In view of these circumstances, it is reasoned that the chip package 1, basically a rectangle in outer shape, and minimum in size, while matching sizes as well as dispositions of respective chip components mounted therein, is optimal.

Next, respective configurations of the path linking the cavity formed in the sensor element to the outside of the thermosetting resin, and the outlet of the path, together with dispositions thereof, are described hereinafter with reference to FIGS. 3 through 5. If the formation of the path 13 shown in FIG. 3 is executed in parallel with the dispositions of those chip components, this will be most efficient in view of respective shapes of the spots of the lead frame 6, where the sensor element 2 and the drive circuit 3 are mounted, respectively. More specifically, the path 13 is suitably formed directly underneath the sensor element 2, and the drive circuit 3, respectively. In this connection, if the outlet 14 of the path 13 is provided between the sensor element 2 and the drive circuit 3, this will cause intermingling with the respective gold bonding wires 8a, and therefore, the formation of the path 13 is practically impossible. Accordingly, the outlet 14 is preferably provided at a location on a side of the drive circuit 3, directly opposite from the disposition of the sensor element 2, as shown in FIG. 5. For these reasons, if the sensor element 2, the drive circuit 3, the cavity 10 of the sensor element 2, and the outlet 14 communicating with the outside of the thermosetting resin 9 are disposed in the same straight-line direction, and the drive circuit 3 is disposed between the sensor element 2 and the outlet 14, this will enable the chip components to be efficiently disposed to thereby reduce the size of the chip package 1.

As shown in the planar configuration of the chip package according to the embodiment of the invention, shown in FIGS. 1, and 5, respectively, the shape of the thermosetting resin 9 covering the lead frame 6 with the chip components mounted thereon is the rectangular chip package 1, symmetrical about the midpoint thereof, as seen in the front elevation of the chip package 1. In the case of this configuration, since the whole periphery of the chip thermistor 5 that detects the air-temperature is encapsulated with the thermosetting resin 9, as is the case with the other chip components, the chip thermistor 5 small in thermal capacity undergoes a pseudo-increase in thermal capacity, so that there is the risk of deterioration in trackability, that is, responsiveness against variation in the air-temperature. Furthermore, there is a concern about a possibility of deterioration in detection accuracy with respect to the temperature of the fluid under measurement, owing to heat transfer occurring via the intake-pipe path, and the enclosure 15 of the thermal-type flowmeter by the intermediary of the thermosetting resin 9 sealing the whole periphery, and the lead frame 6. This problem can be overcome by the following countermeasures.

Figure 6:
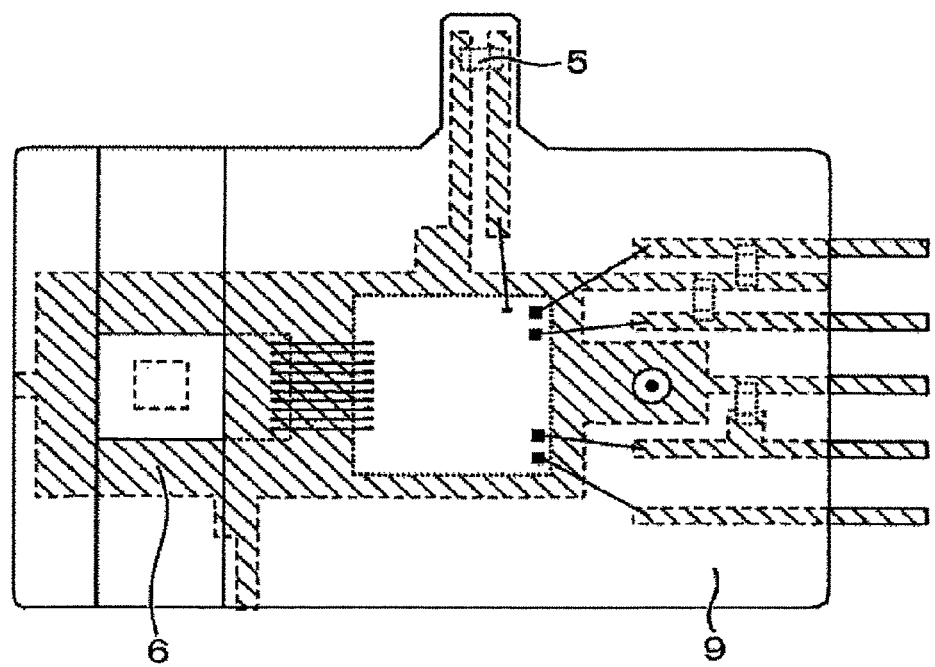
FIG. 6 is a view showing a planar configuration of a chip package according to a third embodiment of the invention.

Next, a preferable disposition of the chip thermistor 5 that detects the temperature of the fluid under measurement, and a chip package structure are described hereinafter with reference to FIGS. 6 and 7. FIG. 6 is a view showing a planar configuration of a third embodiment of a chip package according to the invention. In order to overcome the problem described as above, a lead frame 6 on which a chip thermistor 5 is to be mounted is preferably extended before the chip thermistor 5 is mount thereon, and a shape of the resin 9 for encapsulation, as well, is preferably in an irregular shape with only a part thereof, corresponding to a part of the lead frame 6, where the chip thermistor 5 is mounted thereon, being protruded. By so doing, it is possible to check the pseudo-increase in the thermal capacity, and adverse effects on the detection accuracy owing to the heat transfer from the thermosetting resin 9 and the lead frame 6, respectively.

Figure 7:
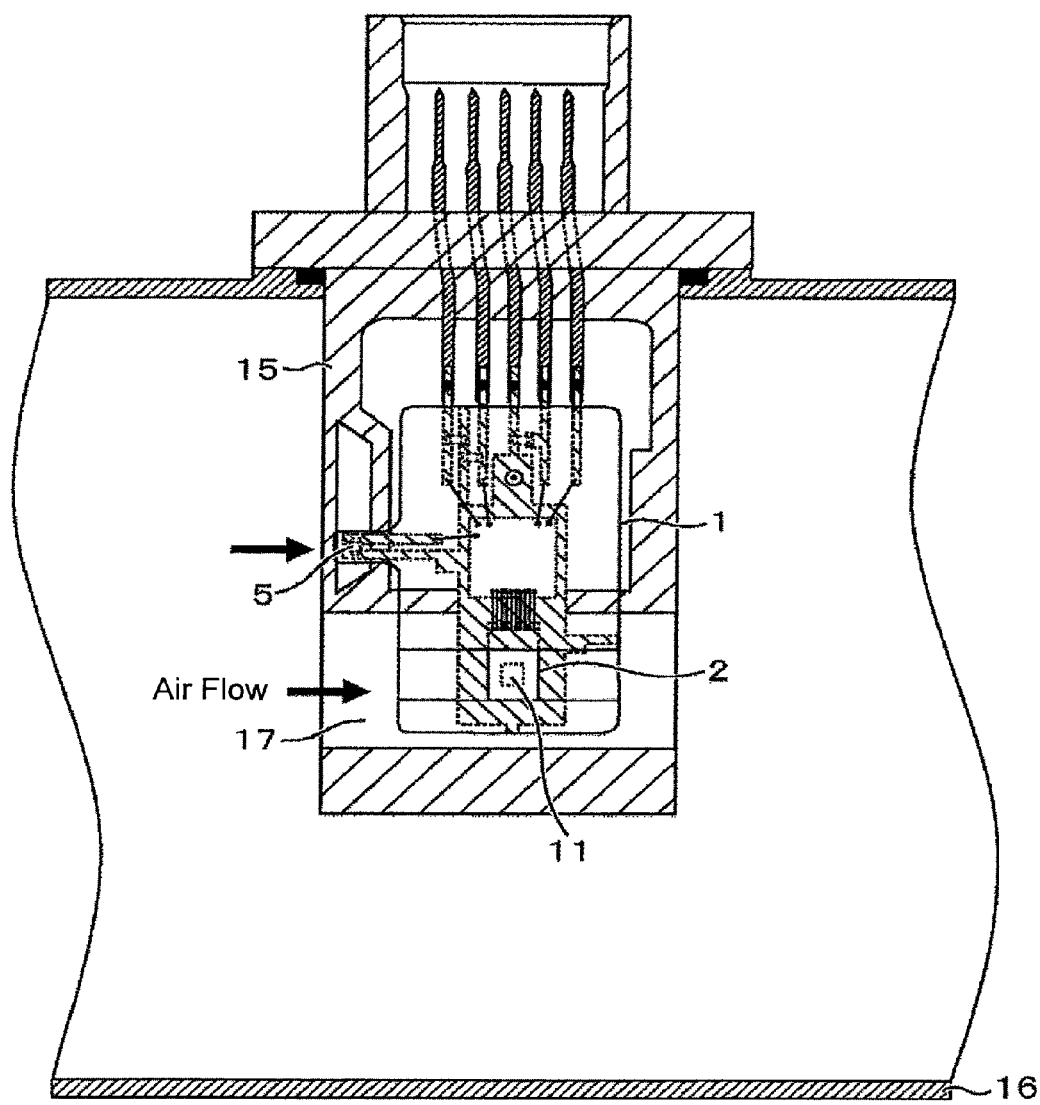
FIG. 7 is a configuration diagram of a thermal-type flowmeter where the chip package according to the third embodiment of the invention is mounted.

FIG. 7 shows an example in which the chip package according to the third embodiment of the invention is mounted in the thermal-type flowmeter. As a preferable method for mounting the chip package 1 in the enclosure 15, it is suitable to dispose the chip thermistor 5 upstream in the flow of an intake air, in the case where the chip thermistor 5 is mounted in the enclosure 15 of the thermal-type flowmeter, that is, at a location where an air comes in direct collision therewith. Disposition of the chip thermistor 5 at the location where the air comes in direct collision therewith will enable variation in the air-temperature to be detected faster with higher accuracy. In FIG. 4, both a flow-rate detector 11 of the sensor element 2, and the chip thermistor 5 are disposed inside the same sub-path 17. As for the sub-path 17, various shapes, such as the detour-shape, and so forth, can be taken into consideration, and in the case where the chip package depicted in FIG. 6 is applied to the sub-path 17, it is preferable to dispose the sensor element 2 in the sub-path 17, whereas the chip thermistor 5 is disposed directly in the intake-pipe path 16. By so doing, the air-temperature can be detected by the chip thermistor 5 with high accuracy without depending on the shape of the sub-path 17.

Figure 8:
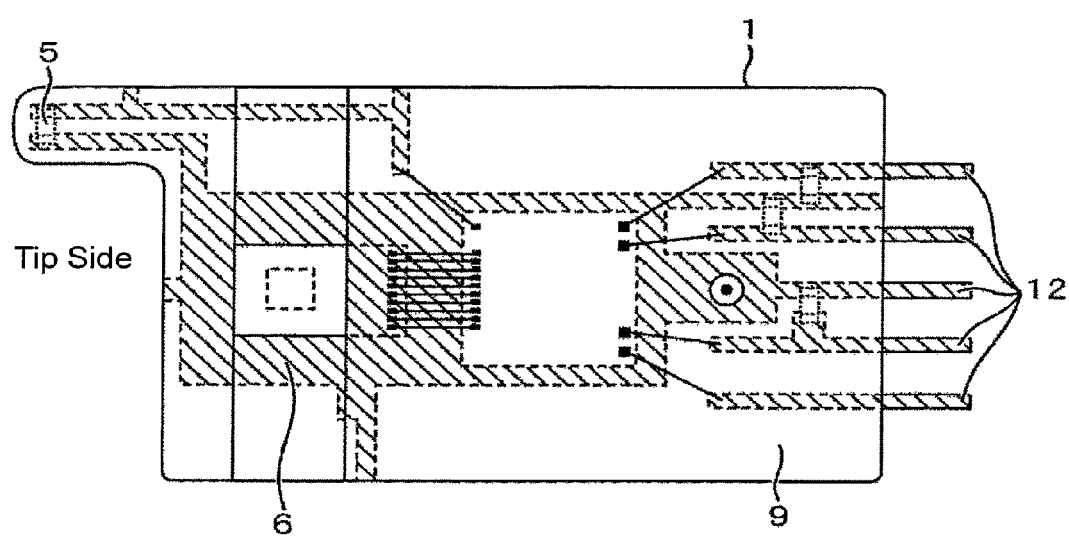
FIG. 8 is a view showing a planar configuration of a chip package similar to that of the third embodiment of the invention.
Figure 9:
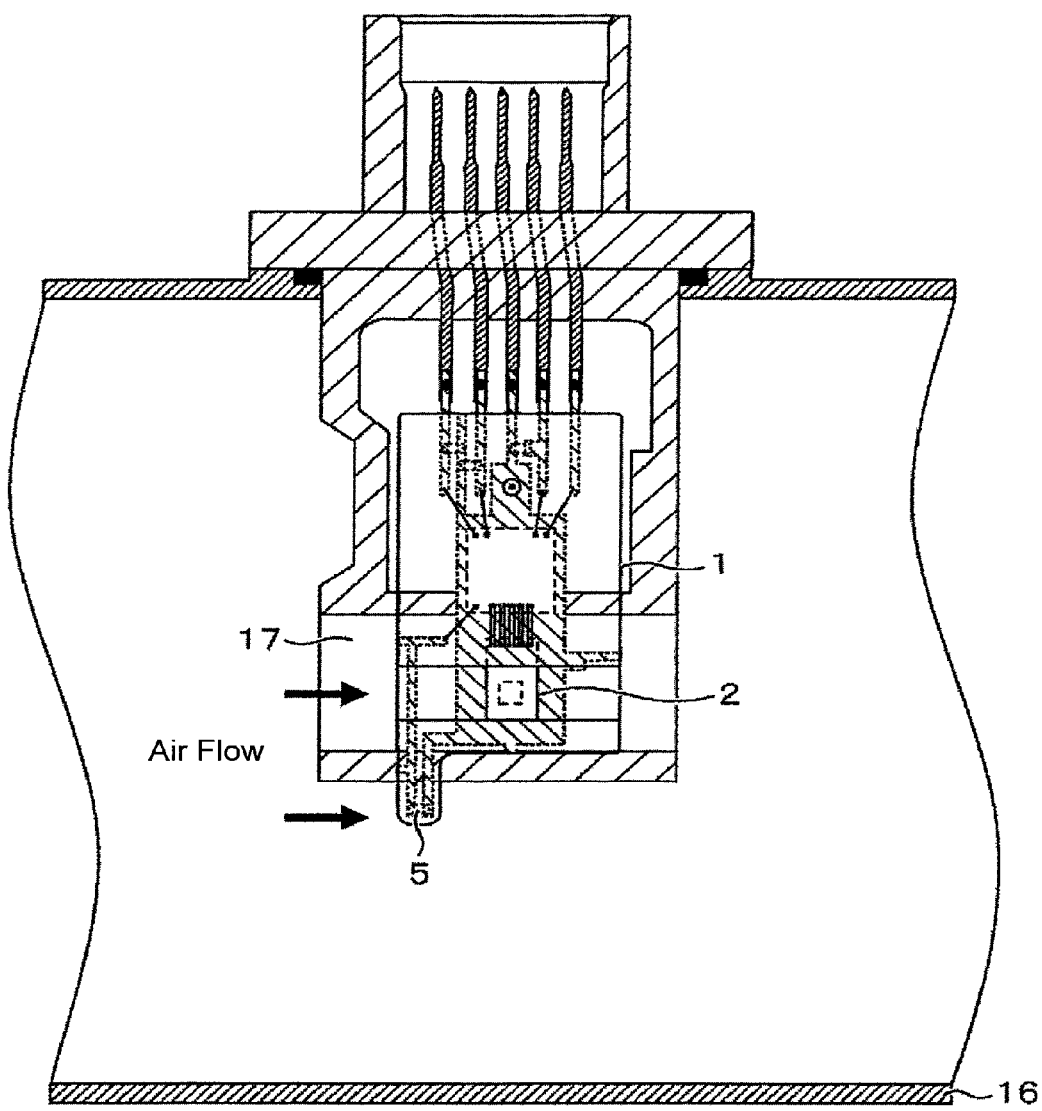
FIG. 9 is a block diagram of a thermal-type flowmeter where the chip package similar to that of the third embodiment of the invention is mounted.

Now, a variation to the third embodiment of the invention is described with reference to FIGS. 8, and 9. FIG. 8 is a view showing a planar configuration of the variation to the third embodiment of a chip package according to the invention. The configuration has a feature in that the chip thermistor 5 is disposed at a position directly opposite from a direction in which the input-output terminals 12 protruding from the thermosetting resin 9 of the chip package 1 is protruded, that is, at a position on a side of the chip package 1, adjacent to the tip thereof. In this configuration as well, a part of the lead frame 6, with the chip thermistor 5 mounted thereon, is extended, and the thermosetting resin 9 as well is in a shape where only a part thereof, corresponding to the part of the lead frame 6, with the chip thermistor 5 mounted thereon, is protruded, so that advantageous effects owing to the configuration described with reference to FIG. 7 can be similarly obtained. Further, FIG. 9 shows an example of a configuration in the case where the chip package according to the variation is mounted in the thermal-type flowmeter, and if the sub-path 17 is in the shape of a straight-line, the sensor element 2 is preferably disposed in the sub-path 17, and the part of the lead frame 6, for mounting the chip thermistor 5, protruded on the tip side of the enclosure 15, is preferably disposed in the intake-pipe path 16.

There is described hereinafter a suitable embodiment of a chip package according to the invention, in respect to the thickness thereof, by comparing FIG. 3 with FIG. 10. First, T1 denoted in FIG. 3 is the thickness of the chip package according to the second embodiment of the invention. Assuming that the chip package is mounted in the thermal-type flowmeter, in the case of the chip package proposed by the invention, in general, an upper limit of the thickness of the chip package is determined depending on the width of the enclosure and flexibility in mounting. If the thickness is excessively small, rebounding will obviously occur due to insufficiency in strength, and so forth, and therefore, a lower limit value as well exists, however, there is basically the need for holding back the thickness of the chip package as much as possible from the standpoint of layout flexibility.

To describe further by taking an example shown in FIG. 3, the respective loop heights of the gold bonding wires 8a, 8b can be cited as one of factors for determining the thickness of the chip package. The respective loop heights of the gold bonding wires 8a, 8b are dependent on a chip height of the sensor element 2 as well as the drive circuit 3, as respective targets for connection, and a step (a distance from the surface of each of the chip components to a chip-component mounting plane) in the lead frame 6. In other words, if the sensor element 2 differing in chip height from the drive circuit 3, and the drive circuit 3 are adopted, this will be more advantageous from a standpoint of reducing the thickness of the chip package 1.

Figure 10:
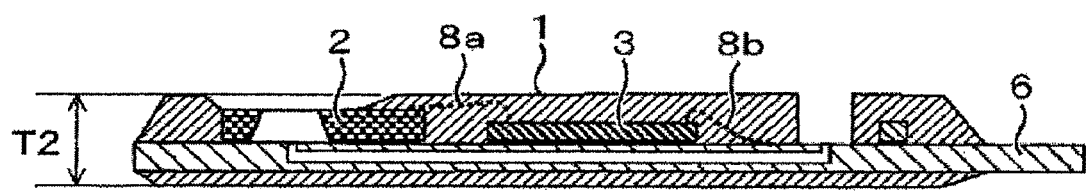
FIG. 10 is a sectional view of a suitable chip package based on the second embodiment of the invention.

FIG. 10 shows an example in which the drive circuit 3 is lower in height than the sensor element 2. If such a combination of the chip components is adopted, a reduced portion of the height can be assigned for use as the respective loop heights of the gold bonding wires 8a, 8b, so that the highest point of the gold bonding wires 8a as well as the highest point of the gold bonding wires 8b can be lowered, thereby enabling the thickness of the chip package 1 to be smaller (T1>T2). Further, in connection with a relationship between the sensor element 2 and the drive circuit 3, in respect of the chip height, if a combination of the sensor element 2 lower in the chip height than the drive circuit 3, and the drive circuit 3 are adopted, similar advantageous effects can be obtained, so that adoption of such a combination of the chip components poses no problem in particular.

LIST OF REFERENCE SIGNS 1 chip package
2 sensor element
3 drive circuit
4 chip capacitor (protection circuit)
5 chip thermistor (air-temperature detecting element)
6 lead frame
7a adhesive
7b electrically conductive adhesive
8a, 8b gold bonding wire
9 thermosetting resin (encapsulation resin)
10 cavity
11 thin-film part (flow-rate detector)
12 input-output terminal
13 path
14 outlet
15 enclosure
16 intake pipe path
17 sub-path
18 circuit chamber
19 boundary
20 connector
21 connector terminal

The invention claimed is:

1. A thermal-type flowmeter including a sensor element having an exothermic resistor formed on a diaphragm, a temperature detecting element, and a drive circuit electrically connected to the sensor element, comprising:
   a chip package formed through encapsulation with a resin of the sensor element, the drive circuit, a metal lead frame adapted to have mounted thereon the sensor element and the drive circuit, and the temperature detecting element, wherein:
   the chip package has an exposed structure in which a surface of the sensor element having the diaphragm is exposed, and
   the temperature detecting element is mounted on the lead frame via an electrically conductive member.

2. The thermal-type flowmeter according to claim 1, wherein the chip package is in a shape with a portion thereof, where the temperature detecting element is mounted, being protruded.

3. The thermal-type flowmeter according to claim 2, wherein a direction of the protrusion of the portion of the chip package is an upstream direction of a flow of the fluid under measurement.

4. The thermal-type flowmeter according to claim 2, wherein a direction of the protrusion of the portion of the chip package is a direction perpendicular to the flow of the fluid under measurement.

5. The thermal-type flowmeter according to claim 2, wherein the chip package has a connection terminal for electrical connection with an outside of the chip package, and is in a shape with the portion thereof being protruded in a direction perpendicular to a direction of the connection terminal.

6. The thermal-type flowmeter according to claim 2, wherein the chip package has the connection terminal for electrical connection with the outside of the chip package, and is in a shape with the portion thereof being protruded in a direction horizontal to the direction of the connection terminal.

7. The thermal-type flowmeter according to claim 1, further comprising a sub-flow path that takes in a part of a fluid under measurement passing through a main flow path, wherein the chip package is provided such that a portion on which the sensor element is mounted is disposed in the sub-flow path and a portion on which the temperature detecting element is mounted is disposed in the main flow path.

8. The thermal-type flowmeter according to claim 1, wherein:
   the metal lead frame has a mounting portion on which the drive circuit is mounted and a protruding portion that protrudes from the mounting portion, and
   the temperature detecting element is mounted on the protruding portion.

9. The thermal-type flowmeter according to claim 1, wherein the chip package has a capacitor mounted on the lead frame, the capacitor being encapsulated with the resin.

* * * * *